United States Patent
Schwartz et al.

(12) 
(10) Patent No.: US 6,264,863 B1
(45) Date of Patent: Jul. 24, 2001

(54) PROCESS FOR PREPARING CERAMIC MASSES OR WORKPIECES

(75) Inventors: Sylvia Schwartz, Koblenz; Peter Quirmbach, Ransbach-Baumbach; Winfried Geis, Nievern; Werner Weiand, Siershahn, all of (DE)

(73) Assignee: Zschimmer & Schwarz GmbH & Co. KG Chemische Fabriken, Lahnstein (DE)

( * ) Notice: Subject to any disclaimer, the term of this patent is extended or adjusted under 35 U.S.C. 154(b) by 0 days.

(21) Appl. No.: 09/069,724

(22) Filed: Apr. 29, 1998

(30) Foreign Application Priority Data

May 2, 1997 (DE) .............................................. 197 18 672

(51) Int. Cl.$^7$ ................................................ C04B 35/636
(52) U.S. Cl. .......................... 264/109; 264/669; 264/670; 106/146.1; 106/156.4
(58) Field of Search ..................................... 264/669, 670, 264/109; 106/146.1, 156.4

(56) References Cited

U.S. PATENT DOCUMENTS

| | | | | |
|---|---|---|---|---|
| 4,745,092 | * | 5/1988 | Prunier | 501/119 |
| 5,601,076 | * | 2/1997 | Battist et al. | 127/58 |
| 5,860,945 | * | 1/1999 | Cramer et al. | 602/62 |
| 5,925,405 | * | 7/1999 | Khan | 264/669 |

OTHER PUBLICATIONS

Abstract of (DE 19505912 & WO9626167), Aug. 1996.*
Abstract of JP 02225359A, Sep. 1990.*

* cited by examiner

*Primary Examiner*—James Derrington
(74) *Attorney, Agent, or Firm*—John F. A. Earley; John F. A. Earley, III; Harding, Earley, Follmer & Frailey

(57) ABSTRACT

The invention concerns binders for ceramic materials, in particular water soluble sugars and sugar alcohols.

1 Claim, No Drawings

PROCESS FOR PREPARING CERAMIC MASSES OR WORKPIECES

It is known, for fabricating ceramic masses and workpieces, to add a suitable binder or combination of binders to a ceramic granular mixture, to obtain a sufficient strength in processing or use of said materials or the formed pieces being made thereof.

Among the known binders are phosphates, as monoaluminum phosphate, alkali silicates, aluminium sulfate, synthetic resins as well as several inorganic and organic binders.

For certain applications it is sufficient to use so-called temporary binders. Their function is, above all, to ensure the green strength of a formed piece, until—during the pyroprocess—the product strength is taken over particularly by a ceramic bond.

Especially in the hot forming process, for example in injection moulding or in hot extrusion, the use of thermoplastic binders in ceramic materials is known. The mixture is heated to a temperature above the melting point of the binder, thereby converted to a flowable (viscous) form and then processed. After forming, the binder has to be removed from the green workpiece (ceramic body) before a usual sintering process follows.

The so-called "binder removal" presents processing as well as ecological problems. If solvents are used for extracting the binders, apart from the binder additional noxious substances are obtained which have to be disposed of. EP 0 362 866 A2 describes details about that. Incidentally, in that document a method for producing a sintered workpiece is described, wherein an organic binder is used, which consists of a thermoplastic organic polymer one portion of which being soluble in water and another portion being not soluble in water. After forming, the shaped piece is brought into contact with water and the water-soluble polymer portion is extracted before the product is sintered.

The degree of extraction of the binder attainable by water storage (water treatment) is noticeably below 50% so that the problems described above are essentially true as well in the removal of the remaining binder.

Specific binder combinations for producing ceramic masses and shaped products are also described in EP 0 517 129 B1, EP 0 599 285 B1, DE 44 38 962 A1 and EP 0 519 326 B1. In all those cases, a partial binder removal is effected by the use of water as a solvent.

It is one object of the invention to propose a non-polluting and optimized processing technology, to obtain an at least temporary bond in ceramic masses and shaped products (workpieces).

In this regard, the invention is based on the realization that this object can be attained by using a modified sugar or sugar alcohol as a binder or binder component for preparing ceramic masses and workpieces.

Here, the term "sugar" means mono- and oligosaccharides. Those low-molecular carbohydrates are sweet, water-soluble, crystalline and amorphous compounds of a definite molecular weight.

The said carbohydrates are to be delimited from polysaccharides which have no uniform molecular weight, as most polymers, and dissolve in water only with difficulty or not at all.

The term sugar alcohols describes a group of polyhydroxy compounds which have been produced from monosaccharides by reducing the carbonyl function. These sugar alcohols are predominantly crystalline but may also be amorphous in the modified form. They are water-soluble polyols. Depending on the number of hydroxy groups contained in the molecule, one distinguishes tetritols, pentitols and hexites. Among others, glycerin and adonite are of the naturally occuring sugar alcohols.

The mentioned sugars and sugar alcohols both have a "sticky consistency" which makes them particularly suitable for the use as a binder or binder component. Another essential advantage is that both materials have a very good water solubility.

It follows therefrom that, in the production of ceramic materials and the following processing to formed pieces, they carry out the following functional mechanism:

For example, in forming a ceramic material the addition of carbohydrates results in that the ceramic particles stick together. In increasing the temperature to prepare the ceramic material with the added binder for the following forcing (shaping) processes of the type mentioned above (e.g. injection moulding, hot extrusion), the binder is converted into a condition of matter with low viscosity, which makes the material altogether plastic so that also complex ceramic workpieces can be easily pressed, injection-moulded or cast into the desired shape.

Another advantage is that the adhesive effect of the binder will be lost at increased temperatures (about 140 to 150° C.) because of the hygroscopicity, that is not only does it not hinder the shaping in this phase but supports it positively.

Even in using crystalline sugars it was found that they do not recrystallize any more, provided that they were converted into the viscous condition once by increasing the temperature. This is advantageous, because possible portions of the sugar or sugar alcohol remaining in the green compact may not lead to microcracks in the ceramic structure by recrystallization.

The water solubility being noticeably increased with respect to known binders results in that the binder can be extracted easily and almost totally by a simple water storage after forming. This dissolving is promoted, if the treatment is effected in heated water.

In that the binder is a material used often also in the food industry, it further follows directly that the remaining sugar solution does not require a special waste disposal and, especially, does not contain any toxic components.

Depending on whether the binder consists totally or partly of the said sugars or sugar alcohols, it will be removed totally or partly from the formed piece in the following extraction step. There, extraction values of 60 to 99% can be achieved easily, depending on the duration of the water storage (usually 1 to 6 hours) and the water temperature (preferably 30 to 70° C.).

An optimized choice is the use of the said sugars and sugar alcohols in the amorphous form.

Part of the latter group are sugars or sugar alcohols being modified by ethoxylation or propoxylation, alkoxylated carbohydrates, hydrogenated or partly hydrogenated carbonhydrates and/or alkoxylated, hydrogenated or partly hydrogenated carbohydrates as the water-soluble component.

A caramelization under heat, being negative with respect to a usage as binder, is prevented by the mentioned selection.

As explained, the selected binders may be used alone or in combination with other auxiliary agents. In the latter case, the portion of sugar/sugar alcohol is usually 40 to 90% by wt. Additives may be lubricants, wetting agents or forming aids as are known in the ceramic processing techniques. This includes, among others:

Polymers of polyethylene, polypropylene and/or ethylene-vinyl-acetate-copolymers of ethylene vinyl acetate and/or ethylene vinyl ester as lubricants, which result in a homogenization of increase in pressure in extruding; tensides, particularly nonionic tensides (e.g. polyglycol fatty acid ester) as wetting agents or wax ester (e.g. beeswax or wool grease).

The portion of binder in the ceramic material, for example a porcelain mass, may be up to 20% by wt, relative to the total mass.

In the following, the invention is described in more detail by way of an example:

85% parts by weight of a ceramic material based on alumina ($Al_2O_3$) are mixed with 15% by wt. of a binder having the following composition:

75% by wt. of sorbite propoxylated, 15% by wt. of ethylene vinyl ester and 10% by wt. of beeswax. After mixing (homogenization) in usual ceramic mixers, the binder-containing material is heated to 160 to 180° C. for the binder to convert to a condition of matter with low viscosity.

Then, the ceramic material is moulded by dry-pressing into formed pieces like cups and plates and has an excellent green strength afterwards.

Then, the formed pieces are inserted in water of 50 degrees for 5 hours. Here, practically all of the sorbit portions, above all, are extracted by diffusion processes. In parallel, particularly the amount of open pores within the formed piece increases proportionally, the green strength, however, remaining practically unchanged because of the previous moulding process.

In this case, a degree of extraction of the binder of about 75% was attained.

The remaining binder portion in connection with the increased (open) porosity after the extraction is harmless with respect to processing in the following pyro-process (firing). During heating, a removal of the remaining binder (binder removal) occurs via the open pore structure, the sintering of the product following thereafter.

Structure damages have not been noticed.

Process for preparing ceramic masses or workpieces

What is claimed is:

1. Process for preparing ceramic masses or workpieces, wherein a modified sugar or sugar alcohol is used as a binder or binder component which is mixed into the ceramic masses or workpieces with the provision that a sugar or sugar alcohol modified by ethoxylation or propoxylation is used.

* * * * *